US008708793B1

(12) United States Patent
Osman et al.

(10) Patent No.: US 8,708,793 B1
(45) Date of Patent: Apr. 29, 2014

(54) MODIFIED BLACKJACK GAME METHOD

(71) Applicants: Allan Osman, Las Vegas, NV (US); Adam Osman, Las Vegas, NV (US); Reagan Pfifer, Las Vegas, NV (US)

(72) Inventors: Allan Osman, Las Vegas, NV (US); Adam Osman, Las Vegas, NV (US); Reagan Pfifer, Las Vegas, NV (US)

( * ) Notice: Subject to any disclaimer, the term of this patent is extended or adjusted under 35 U.S.C. 154(b) by 0 days.

(21) Appl. No.: 13/662,519

(22) Filed: Oct. 28, 2012

(51) Int. Cl.
*A63F 13/00* (2014.01)
*A63F 9/24* (2006.01)

(52) U.S. Cl.
USPC .................... 463/12; 463/11; 463/23; 463/25

(58) Field of Classification Search
USPC ............................................................ 463/12
See application file for complete search history.

(56) References Cited

U.S. PATENT DOCUMENTS 5,141,234 A 8/1992 Boylan
5,280,915 A 1/1994 Groussman
5,615,888 A 4/1997 Lofink
5,632,487 A 5/1997 Nguyen
5,944,314 A 8/1999 Stavinsky
5,979,897 A 11/1999 Grossman
6,506,118 B1 * 1/2003 Baerlocher et al. ............. 463/25
6,991,538 B2 1/2006 Cannon
7,066,466 B1 6/2006 Stavinsky et al.
7,222,854 B2 5/2007 Sorge
2010/0004051 A1 * 1/2010 Walker et al. ................... 463/22

* cited by examiner

*Primary Examiner* — Steven J Hylinski

(57) ABSTRACT

This embodiment of our Modified Blackjack Game Method provides predetermined rules that allow a player to compete against other players on a table, and against the "house" on an electronic video gaming device, in much the same way as the traditional game of blackjack has always been played throughout history, except that it also provides predetermined rules that cause one suit to subtract from player totals instead of adding to them. It also provides predetermined rules that describe winning hands that are not used in other forms of blackjack, as well as providing predetermined rules for comparing negative value hands with positive values hands. These predetermined rules present unexpected challenges to, and require new winning strategies from, even the most experienced player. Further features will be described and become apparent in the detailed description in the specification.

2 Claims, 6 Drawing Sheets

MODIFIED BLACKJACK GAME METHOD

COPYRIGHT NOTICE

A portion of the disclosure of this patent document contains material which is subject to copyright protection. The copyright owner has no objection to the facility reproduction by anyone of the patent document or the patent disclosure, as it appears in the patent and trademark office patent file or records, but otherwise the copyright owner reserves all copyright rights whatsoever.

SOURCE CODE IN ASCII FORMAT TEXT FILES

1_of__18_main-m.txt; created: 10-9-12; size: 1 kb
2_of__18_AppDelegate-h.txt; created: 10-9-12; size: 1 kb
3_of__18_AppDelegate-m.txt; created: 10-9-12; size: 3 kb
4_of__18_ViewController-h.txt; created: 10-9-12; size: 4 kb
5_of__18_ViewController-m.txt; created: 10-9-12; size: 47 kb
6_of__18_ViewControllerxib.txt, created: 6-26-12; size: 77 kb
7_of__18_SoundsController-h.txt; created: 10-9-12; size: 1 kb
8_of__18_SoundsController-m.txt; created: 10-9-12; size: 4 kb
9_of__18_BHBJHelpViewController-h.txt; created: 10-9-12; size: 1 kb
10_of__18_BHBJHelpViewController-m.txt; created: 10-9-12; size: 2 kb
11_of__18_BHBJHelpViewController-xib.txt; created: 2-3-12; size: 15 kb
12_of__18_BHBJCard-h.txt; created: 10-9-12; size: 1 kb
13_of__18_BHBJCard-m.txt; created: 10-9-12; size: 2 kb
14_of__18_BHBJHand-h.txt; created: 10-9-12; size: 1 kb
15_of__18_BHBJHand-m.txt; created: 10-7-12; size: 3 kb
16_of__18_BHBJHelp-html.txt; created: 9-30-12; size: 7 kb
17_of__18_BHBJ-Info-plist.txt; created: 2-1-12; size: 2 kb
18_of__18_BHBJ-Prefix-pch.txt; created: 2-2-12; size: 2 kb The source code of the embodiment of our Modified Blackjack Game Method that we shall describe in the specification, and that was presented in the text files referenced above, was programmed in Xcode, which is available from Apple Computer, Inc., Cupertino, Calif. The programming was done on an Apple Mac Computer. The software program is designed to play on an Apple iPad Tablet. No other hardware is necessary to run the software and to display this embodiment of our Modified Blackjack Game Method on the Apple iPad.

Our Modified Blackjack Game Method can be easily programmed into the software that runs Electronic Video Gaming Devices of all kinds, including but not limited to, Electronic Video Gaming Slot Machines, Websites, Televisions, Tablets and Smartphones, by any programmer with average skills. Electronic video gaming devices are manufactured by IGT, Bally, Aristocrat, and Williams Gaming, among others. Software controlled, Internet Televisions are manufactured by Samsung, Vizio, Panasonic, Sony, among many other companies. Tablet Computers and Smartphones are manufactured by Apple, Samsung, HTC, Motorola, among many others as well.

BACKGROUND

Blackjack's precursor was twenty-one, a game of unknown origin. The first written reference to the game of twenty-one is found in a book by the Spanish author Miguel de Cervantes, who is most famous for writing Don Quixote. When twenty-one was introduced in the United States, gambling houses offered bonus payouts to stimulate players' interest. One such bonus was a ten to one payout if the player's hand consisted of the Ace of Spades and a Black Jack (either the Jack of Clubs or the Jack of Spades). This hand was called a "Blackjack" and the name stuck to the game, even though the ten to one bonus was soon withdrawn. In the modern game, a Blackjack refers to any hand of an ace plus a ten or face card, regardless of suits or colours.

Object of the Game

The game of blackjack is generally played on a table with one or more players all playing against the bank, or against the dealer, being the representative of the bank. In modern times, the bank is most often a casino. A player's object is to win money by creating a card total (hand) which will turn out to be higher than the dealer's card total (hand), but without the player's total exceeding 21. Number-cards count as their natural value; the Jack, Queen, and King (also known as "face cards" or "pictures") count as 10; Aces are valued as either 1 or 11 according to the player's choice. If the hand value exceeds 21 points, it busts, and the player, or the dealer, loses and all bets on that hand are immediately forfeited, and thus paid to the winner.

How Blackjack is Dealt

When blackjack is played on a table, cards are dealt either from one or two hand-held decks, from a dealer's shoe with multiple decks, or from a shuffling machine with multiple decks. Players take a position around the table and the dealer deals a card to each player clockwise from the dealer's left-most position, followed by the dealer dealing a card to him or herself. Then the dealer deals an additional card to each of the players according to their positions. The players' initial cards may be dealt face-up, or face-down (more common in single-deck games). The dealer's two cards are dealt first one face up and second one face down (hole card). In European casinos, "no hole card" games are prevalent; the dealer's second card is neither drawn nor consulted until the players have all played their hands.

On their turn, each player must choose whether to "hit" (take a card one or more times), "stand" (play with present cards), "double down" (double wager, take a single card and finish), "split" (if the two cards have the same value, separate them to make two hands), or "surrender" (give up a half-bet and retire from the game). After all players have made their choices and thus finished playing, the dealer's hand is resolved by drawing cards until the hand busts or until the dealer's hand reaches a value of 17 or higher, which is a hand upon which the dealer must stand in all casino games except the relatively few that designate that a dealer must hit with a "soft 17." A "soft 17" is a hand that includes an Ace.

Also, most blackjack games provide a side bet called insurance. Insurance insures the player against the dealer having blackjack and is treated independently of the main wager. Insurance pays 2:1 (meaning the player receives two dollars for every dollar bet) and is available when the dealer's exposed card is an ace. The idea is that the dealer's second card has a fairly high probability to be ten-valued, giving the dealer blackjack.

The dealer never doubles, splits, nor surrenders. If the dealer busts, all remaining player hands win. If the dealer does not bust, each remaining player hand wins if its value is higher than the dealer's, and they lose if lower. In the case of a tied score, known as a "push," bets are normally returned without adjustment. A blackjack beats any hand which is not a blackjack, even a hand that has a value of 21. Blackjack vs.

blackjack is a push. In most casinos, wins are paid out at 1:1, or equal to the wager, except for winning blackjacks, which are traditionally paid at 3:2 (meaning the player receives three dollars for every two bet), or one and a half times the wager. Many casinos today pay blackjacks at less than 3:2 at some tables. The payout rules are subject to individual casino policies in most jurisdictions.

Variations of Blackack

Over the years, many variations of Blackjack have been played recreationally all around the world. Although the casino game development industry has been very active in producing blackjack variations, most of the variations have not actually been adopted for widespread use in casinos. The following are the most well-known twenty-one themed comparing card games which have been adapted or invented for use around the world over time.

Spanish 21 provides players with many liberal rules, including: (1) being able to double down any number of cards (with the option to rescue, or surrender only one wager to the house); (2) payout bonuses for five or more card 21 s, 6-7-8 21 s, 7-7-7 21 s, late surrender, and player blackjacks always winning, and player 21 s always winning. Spanish 21 is most often played without having any 10 cards in the deck (although there are Jacks, Queens, and Kings).

21st-Century Blackjack (known as "Vegas Style" Blackjack) is found in California card rooms. In this form of the game, a player bust does not always result in an automatic loss. Also, depending on the casino, the player can still push if the dealer busts as well, although the dealer typically has to bust with a higher total in order for the player to win.

In Double Exposure Blackjack, the first two cards of the dealer's hand are dealt face up. Blackjacks pay even money, and players lose on ties.

Double Attack Blackjack also has very liberal blackjack rules that provide the option of increasing a player's wager after seeing the dealer's up card. This game is dealt from a Spanish shoe, and blackjacks only pay even money.

Blackjack Switch is played over two hands whose second cards the player is allowed to interchange. For example, if the player is dealt 10-6 and 5-10, then the player can switch two cards to make hands of 10-10 and 6-5. Natural blackjacks are paid 1:1 instead of the standard 3:2, and a dealer 22 is a push.

Multiple Action Blackjack involves a player placing between 2 or 3 bets on a single hand. The dealer then gets a hand for each bet the player places on a hand. Splitting and doubling are allowed, but often limited.

Super Fun 21 allows a player to split a hand up to four times. If the player has six cards totaling 20, he automatically wins. Wins are paid 1:1.

There is a French/German form of Blackjack that is called Vingt-et-un (in French: Twenty-one), or "Siebzehn and Vier" (in German: Seventeen and Four). This game does not allow splitting. An ace can only count as eleven, but two aces count as a blackjack. It is mostly played in private circles and barracks. A British variation is called "Pontoon."

As with all casino games, blackjack incorporates a statistical advantage for the casino built right into the game. The advantage of the dealer's position in blackjack relative to the player comes from the fact that the player loses if the player busts regardless of whether the dealer subsequently busts as well. Even with this advantage, blackjack players using basic strategy will lose less than 1% of their total wagered amount with strictly average luck over time, and this is very favorable to the player compared to other casino games. The loss rate of players who deviate from basic strategy because of their ignorance is in general much greater. Although new teachers of strategy pop up regularly, the basic winning strategies have changed relatively little over time, despite the introduction of the many variations of the game discussed above.

Video Blackjack

Some casinos, as well as general betting outlets, provide blackjack among a selection of casino-style games on electronic video gaming machines. Video blackjack game rules are practically identical to the traditional rules played on tables noted above; variant games are practically never found on video blackjack gaming machines. Most casino rules for playing video blackjack are generally more favorable to the house than the rules offered for table games; e.g., often paying out only even money for winning blackjacks. Video and online blackjack games deal each hand from a fresh deck, rendering card counting much less effective than it can be on tables for the players.

BACKGROUND

Prior Art

The following is a tabulation of some prior art that presently appears relevant:

| U.S. patents | | | |
|---|---|---|---|
| Pat. No. | Kind Code | Issue Date | Patentee |
| 7,066,466 | B1 | Jun. 27, 2006 | Stavinsky |
| 5,280,915 | B1 | Jan. 25, 1994 | Groussman |
| 5,979,897 | B1 | Nov. 9, 1999 | Grossman |
| 5,141,234 | B1 | Aug. 25, 1992 | Boylan |
| 5,615,888 | B1 | Apr. 1, 1997 | Lofink |
| 5,632,487 | B1 | May 27, 1997 | Nguyen |
| 5,944,314 | B1 | Aug. 31, 1999 | Stavinsky |
| 6,991,538 | B1 | Jan. 31, 2006 | Cannon |
| 7,222,854 | B1 | May 29, 2007 | Sorge |

The major shortcomings that would be faced by all games, blackjack included, is the fact that players become habituated to games that they've played over and over again, causing the challenge to win, and the excitement to play, to be diminished over time for many. Although some of the modifications to the traditional game of blackjack have introduced new and unusual card delivery and betting rules, none that we know of actually modify the traditional game in any way near how the predetermined rules in this embodiment of our Modified Blackjack Game Method does, especially relative to overall blackjack gameplay, rules and strategies.

Our Modified Blackjack Game Method includes a basic rule change determining that one suit is broken, and thus all cards of that suit subtract from the player's hand total value instead of adding to it, according to predetermined rules. Other rule changes in our predetermined rules include the presentation of different, never before seen winning hand rules based on values gained in a set number of cards; and they also include predetermined rules that determine outcomes when players compare negative total values with positive total values in their hands. These changes created by the predetermined rules of our Modified Blackjack Game Method can be implemented in a table game of blackjack playing against live opponents; and they can also be easily programmed into the software that controls any electronic video gaming device, such as, but not limited to, electronic video blackjack slot machines, televisions, websites, consoles, computers, tablets and smartphones.

Advantages

One of the advantages of our Modified Blackjack Game Method is that it retains the features of the classic table and video blackjack games, but it offers new rules that present the player with unexpected challenges, challenges that most players have likely never faced before. Any such method of playing blackjack that retains the features of the classic table and video blackjack games, but that also changes the complexity, the dynamics and the strategies needed for winning, would likely stimulate the interest of, and thus likely be welcomed by, all blackjack players, new and experienced, young and old, alike, especially the most competitive ones.

SUMMARY

Our Modified Blackjack Game Method provides predetermined rules that allow players to compete on a table, and against the "house" on an electronic video gaming device, whether a computer, a television, a website, a tablet, a smartphone or an electronic video blackjack slot machine, in much the same way as the traditional game of blackjack has generally been played throughout history, except that it provides predetermined rules that designate cards of one suit to subtract from player totals instead of adding to them. It also provides predetermined rules that describe winning hands that are not used in other forms of blackjack, as well as predetermined rules for comparing negative and positive value hands. Further features of this embodiment will be described and become apparent in the course of the following detailed description.

BRIEF DESCRIPTION OF THE DRAWINGS

A complete understanding of the present embodiment may be obtained by reference to the accompanying drawings, when considered in conjunction with the subsequent, detailed description, in which:

FIG. 5 is a front view of the screen that was displayed after the player was dealt exactly 8 cards with an absolute total between 15 and 21, which according to the rules of this embodiment, gives the player an automatic winning hand, despite the player's total being +19, and thus being the exact same total as the dealer had to stand on;

REFERENCE NUMERALS

Figure 1:
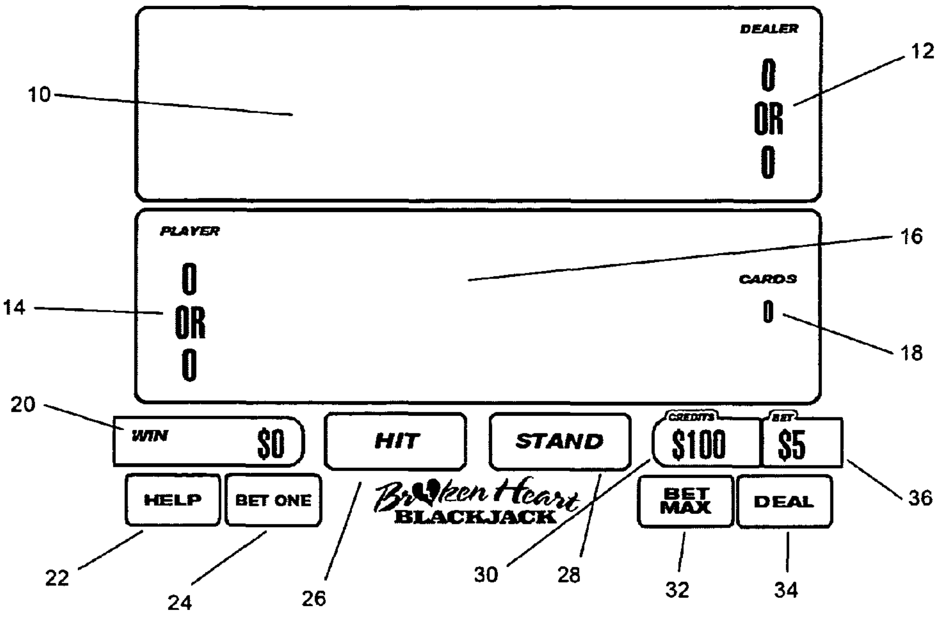
FIG. 1 is a front view of the startup screen of one embodiment of our Modified Blackjack Game Method, as displayed on an Apple iPad.

10 Blackjack Dealer Card Display Location
12 Blackjack Dealer Hand Total Label
14 Blackjack Player Hand Total Label
16 Blackjack Player Card Display Location
18 Blackjack Player Number of Cards in Hand Label
20 Win or Lose Label
22 Help Button
24 Bet One Button
26 Hit Button
28 Stand Button
30 Credit Total Label
32 Bet Max Button
34 Deal Button
36 Current Bet Label

DETAILED DESCRIPTION

We have invented a new way to play the game of blackjack that requires a player to implement new, unique play and betting strategies in order to win. Although it can be played against other live players on a traditional blackjack table, the embodiment that we will be describing here is for a method that can be played by one player on an electronic video blackjack gaming device against the "house," which is most often a casino. Our Modified Blackjack Game Method has been developed as software that has been programmed into an Apple iPad, but that can also be programmed into electronic video blackjack gaming devices, including, but not limited to, electronic video blackjack gaming slot machines, consoles, computers, televisions, websites, tablets, and smartphones, by anyone with average abilities in software programming.

The specific embodiment that we will be describing here has been programmed to play and display on an Apple iPad computer tablet, using the Xcode supplied by Apple Computer Inc. We reference the source code text files above in this document and will submit them as part of our application. The drawings, FIGS. 1-6, are all drawings of screens that a player would see when playing this embodiment of our Modified Blackjack Game Method on an Apple iPad tablet.

SOME IMPORTANT DEFINITIONS

For purposes of explanation, when a suit is defined as and thus considered "broken," it means that instead of adding to the number value of a blackjack hand, cards of the broken suit subtract from the number value of that hand. For this embodiment, we have chosen to predetermine that hearts are the broken suit, and thus hearts subtract from the player's hand value total instead of adding to it, according to predetermined rules. We could have just as easily chosen clubs, diamonds or spades to be the broken suit.

For purposes of explanation, an 8-card special is a hand that a player or a dealer is dealt that consists of exactly 8 cards and that has a numeric value of between absolute 15 and absolute 21, which means that the total value of the hand is either between +15 and +21 or between −15 and −21.

For purposes of explanation, a Broken-Heart Blackjack is a blackjack hand that has both of the two required cards making up the blackjack be of the suit that is considered broken; in this embodiment that suit would be hearts. An example would be a hand consisting of an Ace of Hearts and a Jack of Hearts.

For purposes of explanation, a Half-Broken-Heart Blackjack is a blackjack hand that has one of the two required cards making up the blackjack be of the suit that is considered broken; in this embodiment that suit would be hearts. An example would be a hand consisting of an Ace of Hearts and a Jack of Clubs, which would be a Half-Broken Heart Blackjack despite its absolute number total not being 21, but rather being either 9 or −1.

For purposes of explanation, an "electronic video gaming device" is any device that can manipulate and display information on a video screen, including but not limited to, an electronic video slot machine, a console, a computer, a software controlled television, a website, a tablet, and a smartphone.

DESCRIPTION OF ONE EMBODIMENT

To describe one embodiment of our Modified Blackjack Game Method, we will discuss how our method is played on an electronic video gaming device; although these same rules could be applied to a blackjack card game played on a table. This embodiment of our Modified Blackjack Game Method uses a standard deck comprised of 52 cards. It adds a new twist to the game of Blackjack as it is generally played in casinos around the world, both on tables and on Video Blackjack gaming devices. In our Modified Blackjack Game Method, one suit is broken, that is, instead of adding to the total of the hand, cards of that suit subtract from it. For this embodiment, we have chosen to have the broken suit be Hearts, but it could just as easily be any of the three other suits in a standard deck.

The mechanics of card delivery in our Modified Blackjack Game Method are identical to the mechanics of card delivery in regular blackjack. To start the game, you make your bet and the dealer deals the cards, whether on a casino table or on a video blackjack gaming device. Just as in regular blackjack, aces are worth 1 or 11; and all face cards have a value of 10. Other cards are worth the number value shown on each. But unlike regular blackjack, in this embodiment, all Hearts have negative values that subtract from the total of the hand. Just as in regular blackjack, a player may stand with cards in player's hand or hit (receive another card) to improve the hand. Winning totals are based on the absolute score (−20 beats 19) and are paid based on the Player's and Dealer's ending hands. There are additional predetermined rules explained below.

For an example of the impact that having one suit be broken, and thus subtract from a player's hand value total instead of adding to it, if that player is dealt a hand consisting of a 9 of Clubs and a 2 of Hearts, the total is 7, not 11. If that player is dealt a hand consisting of a 5 of Diamonds and an Ace of Hearts, the total is 4 or −6, not 6 or 16. If a player is dealt a hand consisting of a 2 of Spades and a 7 of Hearts, the hand total is −5. The object of the game is to try to get an absolute (+ or −) total greater than the dealer's absolute (+ or −) total without going over 21 and without going under −21. There are additional predetermined rules that describe how to win at our Modified Blackjack Game Method explained below.

Special Rules for this Embodiment

Dealer stands on any 17 or above and on any −17 or below.

Dealer hits on any 16 or above and on any −16 or below.

Dealer and Player busts when going over 21 or when going under −21.

Dealer and Player must stand with 10 cards no matter what the total.

Absolute score wins (−20 beats 19; 20 beats −19).

Broken Heart score wins on a push (−20 beats 20). All other pushes tie and return bet.

Player wins on an "8-card-special" totaling between 15 and 21 or between −15 and −21.

Dealer wins on an "8-card-special" totaling between 15 and 21 or between −15 and −21.

Player pushes against Dealer's "8-card-special" no matter what the absolute scores.

Dealer and Player can hit for up to 10 cards as needed to create a winning hand without busting, but they only create an 8-Card-Special, and thus an automatic winning hand, if the hand has exactly 8 cards totaling between 15 and 21 or between −15 and −21.

Double Down is offered when First 2 cards total either positive or negative 10 or 11.

Split offered when First 2 cards are a pair of any suit.

Suggested Pays for this Embodiment

Blackjack pays are determined by individual casinos, both for table games and for their video gaming devices. The recommended pays below refer to Broken Heart Blackjack, which is the embodiment of our Modified Blackjack Game Method that predetermines that the suit of hearts is broken, and thus subtracts from the numeric total of a player's hand, but they could also be applied in an embodiment where a different suit is broken, such as with clubs being cracked; spades being spiteful or diamonds being dirty. These are suggested pays and the method could play just as well with different pay scales.

Broken Heart Blackjack (both cards are Hearts) pays 10 for 1.

½ Broken Heart Blackjack (one card is a Heart) pays 5 for 1.

Broken Heart Blackjack pays 5 for 1 against Dealer's Blackjack.

Broken Heart Blackjack pays 3 for 1 against Dealer's ½ Broken Heart Blackjack.

½ Broken Heart Blackjack pays 3 for 1 against Dealer's Blackjack.

Conventional Blackjack pays 3 for 1.

Double down wager equals original bet.

Split wager equals original bet.

All other wins pay 2 for 1.

Bet returned on all pushes.

Game uses one 52 card deck that is shuffled after each hand.

Operation of the Described Embodiment:

On an Apple iPad, and on all touchscreens of electronic video gaming devices, buttons are tapped by the player to make game choices and to control what is displayed on the video display screen. Labels and legends are not affected by a player tapping them; but rather they provide the player with important information about the present game and the player's overall progress and situation.

FIG. 1 shows a startup screen of one embodiment of our Modified Blackjack Game Method displayed on an Apple iPad. When a player turns on the iPad and selects to operate our Modified Blackjack Game Method, this screen will be presented. At the top of the screen is the Blackjack Dealer Card Display Location 10 that displays the cards that the dealer is dealt. Just to the right is the Blackjack Dealer Hand Total Label 12 which displays the value of the cards in the dealer's hand at the time. Below that and to the left is the Blackjack Player Hand Total Label 14 which displays the value of the cards in the player's hand at the time. To the right of that is the Blackjack Player Card Display Location 16 which displays the cards that the player is dealt.

To the right of the Blackjack Player Card Display Location 16 is the Blackjack Player Number of Cards in Hand Label 18 which displays the number of cards in the player's hand at the time. This is important information that helps the player decide whether to go for an Eight Card Special and whether to hit or stand at the time. Below that and all the way to the left is the Win or Lose Label 20 which indicates whether the player wins or loses after the particular hand is finished. Just below that is the Help Button 22 which the player can tap to get important information about rules and gameplay. To the right of that is the Bet One Button which the player taps to set the bet for the next hand. Each tap adds one credit to that bet.

Just to the right of the Win or Lose Label 20 is the Hit Button 26 which the player taps to be dealt an additional card. To the right of that is the Stand Button 28 which the player taps to stand with the cards in player's hand at the time. To the right of that is the Credit Total Label 30 which shows the credits that the player has at the time. To the right of that is the Current Bet Label 36 which shows the credits that the player is betting on the current hand. Just below the Credit Total Label 30 is the Bet Max Button 32 which the player taps to bet the maximum credits allowed for the hand and to start the next deal. To the right of the Bet Max Button 32 is the Deal Button 34 which the player taps to start the deal of the next hand.

Figure 2:
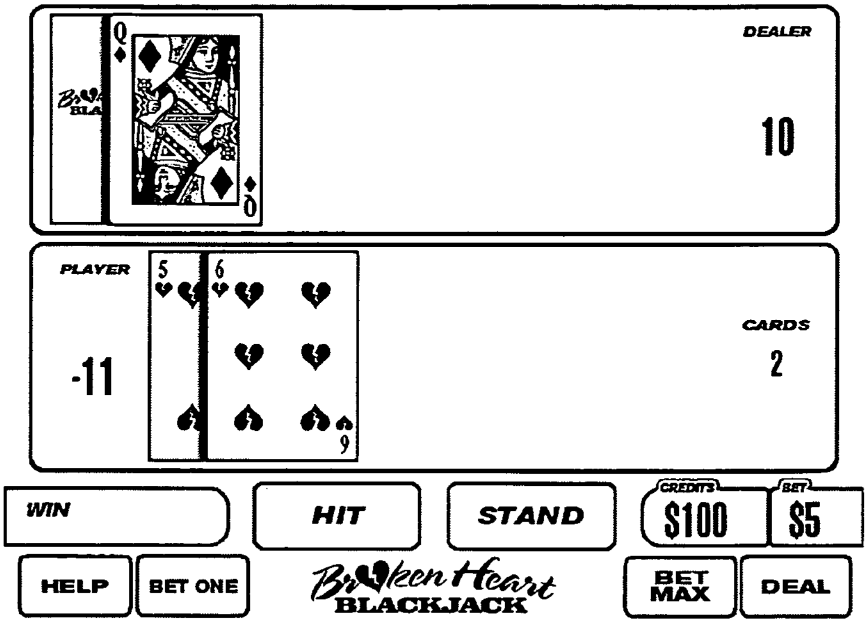
FIG. 2 is a front view of the Apple iPad screen that was displayed on a typical initial deal showing the player with a −11 total because in this embodiment, Hearts subtract from totals instead of adding to them.

FIG. 2 shows the screen that was displayed on a typical initial deal. The player has a starting hand consisting of a 5 of Hearts and a 6 of Hearts which totals −11, and the dealer has a Queen of Diamonds showing which is worth 10. The dealers bottom or hole card is face down and thus hidden from the player's and the dealer's view.

Figure 3:
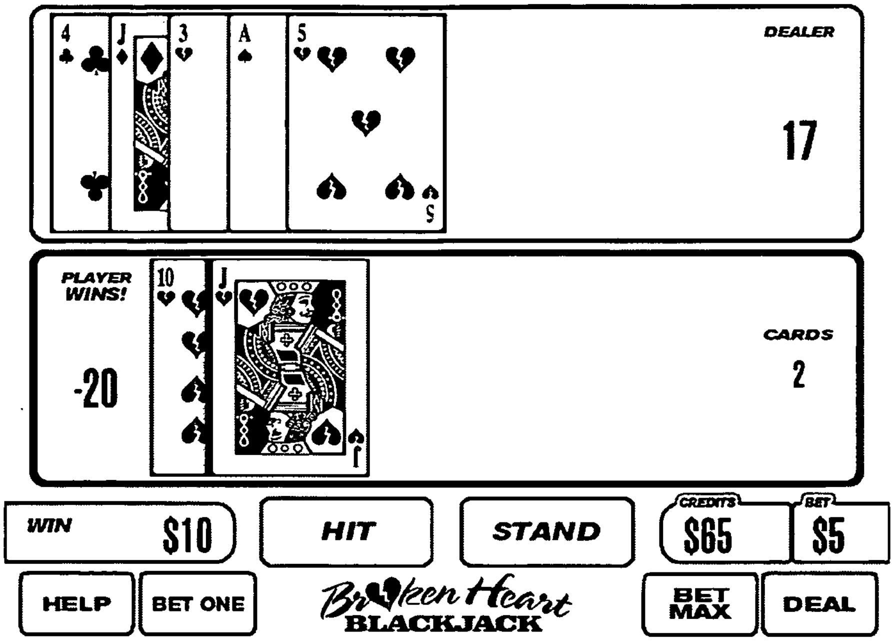
FIG. 3 is a front view of the screen that was displayed after the player chose to stand on a −20 total, and the dealer was forced to stand on a +17 total, showing the rule that the absolute score wins, which was 20 for the player, and 17 for the dealer.

FIG. 3 shows the screen that was displayed after the player chose to stand on a −20 total, and the dealer was forced to stand on a +17 total, showing the rule that the absolute score wins, which was 20 for the player, and 17 for the dealer.

Figure 4:
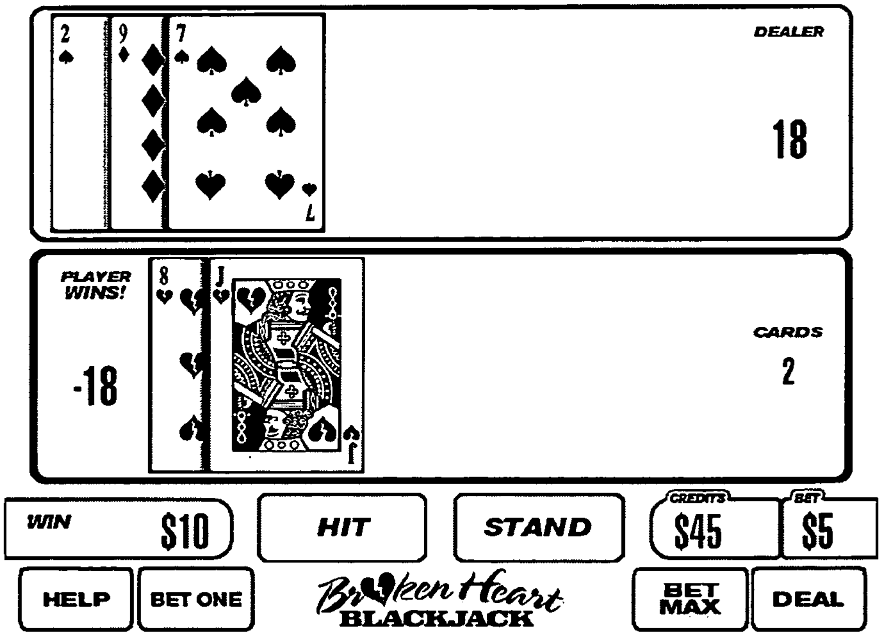
FIG. 4 is a front view of the screen that was displayed after the player chose to stand on a −18 total, and the dealer was forced to stand on a +18 total, showing the rule that a negative score, which was −18 for the player, defeats the identical positive score, which was +18 for the dealer.

FIG. 4 shows the screen that was displayed after the player chose to stand on a −18 total, and the dealer was forced to stand on a +18 total, showing the rule that a negative or broken score, which was −18 for the player, defeats the same positive score, which was +18 for the dealer.

Figure 5:
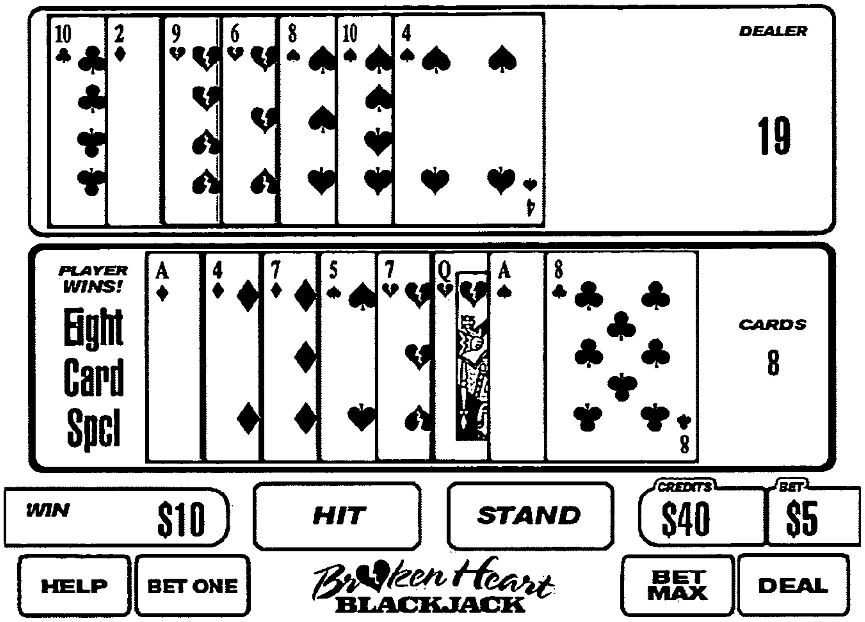

FIG. 5 shows a screen that was displayed after the player received exactly 8 cards with an absolute total of +19, which is between 15 and 21, which according to the rules of this embodiment would be an 8-Card Special that gives the player a winning hand, despite dealer's total also being +19.

Figure 6:
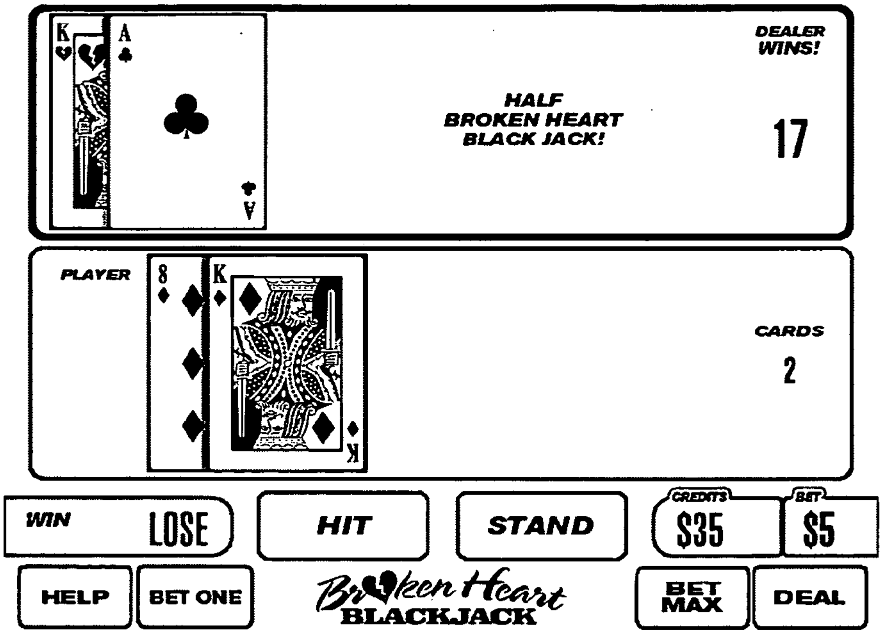
FIG. 6 is a front view of the screen that was displayed after the dealer received what in this embodiment would be called a Half-Broken Heart Blackjack, where one of the two cards making up the blackjack hand is of the suit that subtracts from totals, and thus is considered broken, which in this drawing is the dealer's King of Hearts.

FIG. 6 shows the screen that was displayed after the dealer received what in this embodiment would be called a Half-Broken Heart Blackjack, where one of the two cards making up the blackjack hand is of the suit that subtracts from totals, and thus is considered broken, which in this embodiment and figure is the dealer's King of Hearts.

CONCLUSION, RAMIFICATIONS AND SCOPE

Having illustrated and described one embodiment of the invention above, it should be apparent to those of ordinary skill in the art, that our Modified Blackjack Game Method permits further modification in the rules, arrangement and details. Some, but not all, of the other modifications could include using a different suit as the broken one, although the game plays the same no matter which of the suits is broken. Another optional game rule could be that the player is required to pay an additional fee to hit to receive a $9^{th}$ and/or $10^{th}$ card. Another modification could be that the players can be allowed to hit and receive any number of cards as long as they do not bust. And even another rule modification could be to change the exact number of cards that are required to make a Winning Hand Special; and instead of 8 cards, it could be 7, 9 or any number of cards, and the required numerical total could be between any different range, such as between + or −14 and 20, 16 and 19, 12 and 18, etc. All such modifications are covered by the scope of the invention. Accordingly, the invention should not be limited by the foregoing description, but rather should be defined only by the following claims.

What is claimed is:

1. An improved method for conducting a blackjack-style card game using a processor executing code to send virtual images of playing cards to a video display system at each player position of an electronic video gaming device, the blackjack-style card game being played between a virtual dealer and at least one electronic player position on an electronic video gaming device, according to predetermined rules, utilizing virtual playing cards wherein all face cards of the club, spade, and diamond suits count as ten, aces of the club, spade, and diamond suits count as one or eleven, and all other cards of the club, spade, and diamond suits count as their face value, and wherein all face cards of the heart suit count as negative ten, the ace of hearts counts as negative one or negative eleven, and all other cards of the heart suit count as negative their face value, in which at each player position that receives an initial wager, the processor executing code such that the virtual dealer randomly distributes an initial player position hand of two virtual cards to each player position and two virtual cards to the virtual dealer, the improved method comprising the processor recognizing when it distributes a card of the heart suit to a player position and deducting the appropriate amount from the player position total, and the method comprising the processor recognizing when a player position stands with the two virtual cards received, the processor recognizing when the player position requests an additional card or cards, the processor recognizing when a player position stands with the additional card or cards, the processor recognizing when a player position busts and automatically loses the game according to predetermined rules, the processor recognizing when a player position stands with a winning hand according to predetermined rules, the processor recognizing when the virtual dealer stands according to predetermined rules, the processor recognizing when the virtual dealer hits according to predetermined rules, the processor recognizing when the dealer busts and loses the hand according to predetermined rules, the processor paying a virtual credit or credits to any and all player positions that have been determined to have a winning blackjack hand according to predetermined rules and predetermined payout schedules, the processor collecting a virtual credit or credits from any and all player positions that have been determined to have a losing blackjack hand according to predetermined rules and predetermined payout schedules.

2. An apparatus for playing a blackjack wagering game comprising:

a. a processor;

b. a random number generator;

c. one or multiple player positions each having a video display system;

d. a video display in data communication with the processor;

wherein the processor executes software enabling play a method wherein a processor sends virtual images of playing cards to a video display system at each player position of an electronic video gaming device, the blackjack-style card game being played between a virtual dealer and at least one electronic player position on an electronic video gaming device, according to predetermined rules, utilizing virtual playing cards wherein all face cards of the club, spade, and diamond suits count as ten, aces of the club, spade, and diamond suits count as one or eleven, and all other cards of the club, spade, and diamond suits count as their face value, and wherein all face cards of the heart suit count as negative ten, the ace of hearts counts as negative one or negative eleven, and all other cards of the heart suit count as negative their face value, in which at each player position that receives an initial wager, the processor executing code such that the virtual dealer randomly distributes an initial player position hand of two virtual cards to each player position and two virtual cards to the virtual dealer, the improved method comprising the processor recognizing when it distributes a card of the heart suit to a player position and deducting the appropriate amount from the player position total, and the method comprising the processor recognizing when a player position stands with the two virtual cards received, the processor recognizing when the player position requests an additional card or cards, the processor recognizing when a player position stands with the additional card or cards, the processor recognizing when a player position busts and automatically loses the game according to predetermined rules, the processor recognizing when a player position stands with a winning hand according to predetermined rules, the processor recognizing when the virtual dealer stands according to predetermined rules, the processor recognizing when the virtual dealer hits according to predetermined rules, the processor recognizing when the dealer busts and loses the hand according to predetermined rules, the processor paying a virtual credit or credits to any and all player positions that have been determined to have a winning blackjack hand according to predetermined rules and predetermined payout schedules, the processor collecting a virtual credit or credits from any and all player positions that have been determined to have a losing blackjack hand according to predetermined rules and predetermined payout schedules.

* * * * *